(12) United States Patent
Rotsaert (10) Patent No.: US 10,880,733 B2
(45) Date of Patent: Dec. 29, 2020

(54) METHOD FOR PAIRING ELECTRONIC TERMINALS, CORRESPONDING PAIRING DEVICES, TERMINALS AND PROGRAM

(71) Applicant: INGENICO INC, Boston, MA (US)

(72) Inventor: Christopher Rotsaert, Wasquehal (FR)

(73) Assignee: INGENICO INC, Boston, MA (US)

( * ) Notice: Subject to any disclaimer, the term of this patent is extended or adjusted under 35 U.S.C. 154(b) by 46 days.

(21) Appl. No.: 16/279,260

(22) Filed: Feb. 19, 2019

(65) Prior Publication Data
US 2019/0261166 A1 Aug. 22, 2019

(30) Foreign Application Priority Data

Feb. 19, 2018 (FR) ...................................... 18 51415

(51) Int. Cl.
*H04W 12/00* (2009.01)
*H04W 76/14* (2018.01)
*H04W 4/80* (2018.01)
*H04L 9/32* (2006.01)
*H04W 12/06* (2009.01)
*G09C 1/00* (2006.01)
*H04L 29/06* (2006.01)

(52) U.S. Cl.
CPC ............ *H04W 12/003* (2019.01); *G09C 1/00* (2013.01); *H04L 9/3226* (2013.01); *H04L 63/18* (2013.01); *H04W 4/80* (2018.02); *H04W 12/06* (2013.01); *H04W 76/14* (2018.02)

(58) Field of Classification Search
CPC ...... H04W 12/003; H04W 76/14; H04W 4/80
See application file for complete search history.

(56) References Cited

U.S. PATENT DOCUMENTS

2010/0128632 A1* 5/2010 Mantysalo .......... H04M 1/6066
370/254
2011/0319016 A1* 12/2011 Gormley ............. H04M 1/2757
455/41.1

(Continued)

FOREIGN PATENT DOCUMENTS

EP 2584797 A1 * 4/2013 .............. H04W 4/21
EP 2584797 A1 4/2013

(Continued)

OTHER PUBLICATIONS

Bluetooth Core Specification version 5.0—Dec. 6, 2016, XP055499587 (Year: 2016).*

(Continued)

*Primary Examiner* — Siming Liu
(74) *Attorney, Agent, or Firm* — David D. Brush; Westman, Champlin & Koehler, P.A.

(57) ABSTRACT

A method for pairing a first terminal, called an initiator terminal seeking to transmit and receive data, with a second terminal, called an acceptor terminal. Such a method includes: placing an external surface connector of the initiator terminal on a complementary external surface connector of the acceptor terminal delivering a piece of data to the initiator terminal about the presence of the acceptor terminal; determining, by the initiator terminal, of a parameter of connection; and pairing the initiator terminal with the acceptor terminal according to a mode of pairing depending on the determined parameter of connection.

9 Claims, 3 Drawing Sheets

(56) References Cited

U.S. PATENT DOCUMENTS

2012/0238205 A1   9/2012  Reunamaki et al.
2013/0262299 A1   10/2013 Lacroix et al.
2017/0256970 A1   9/2017  Ciesinski et al.

FOREIGN PATENT DOCUMENTS

WO   2009105115 A2   8/2009
WO   2011127627 A1   10/2011
WO   2012076573 A1   6/2012

OTHER PUBLICATIONS

French Search Report and Written Opinion dated Dec. 3, 2018 for corresponding French Application No. 1851415, filed Feb. 19, 2018.
English translation of the Written Opinion dated Dec. 3, 2018 for corresponding French Application No. 1851415, filed Feb. 19, 2018.
Bluetooth Core Specifications version 5.0—Dec. 6, 2016, XP055499587.
European Notice of Intention to Grant for parallel European Application No. 19158151.1, dated Oct. 23, 2020, 75 pages.

\* cited by examiner

METHOD FOR PAIRING ELECTRONIC TERMINALS, CORRESPONDING PAIRING DEVICES, TERMINALS AND PROGRAM

1. FIELD OF THE INVENTION

The invention relates to the field of authentication. The invention relates more particularly to the hardware authentication of devices with one another. More particularly, the invention relates to the authentication of two devices with each other.

2. PRIOR ART

There are numerous well-known protocols in the prior art by which two devices can authenticate themselves as a preliminary to the transmission or exchange of confidential information. Such is the case for example of a wireless communications terminal seeking to get authenticated on a user's local-area network, for example a Wi-Fi wireless network. To this end, prior to any data exchange, the terminal must get authenticated on the communications network. This authentication generally requires a phase of entry of a key, which is for example a WEP (Wired Equivalent Privacy) key, a WPA (Wi-Fi Protected Access) PSK (pre-shared key) key or the like. One of the problems with this type of key is its length. A WEP key comprises 13 characters while a WPA-PSK key is normally a secret phrase that may be lengthy to enter.

Other sectors require authentication between wireless devices. This is the case for example with devices that communicate by means of Bluetooth® technology. Bluetooth is a wireless technology used to create personal wireless networks working in the 2.4 GHz frequency band, requiring no authorization and having a maximum range of about ten meters. The networks are generally formed by nomadic peripherals such as mobile telephones, personal digital assistants and laptop computers. By default, a Bluetooth communication is not authenticated, and any peripheral device can exchange data with any other peripheral device.

A Bluetooth peripheral (for example a mobile telephone) can choose to ask for authentication in order to provide a particular service. Bluetooth authentication is generally done with PIN codes. A Bluetooth PIN code is an ASCII string with a maximum length of 16 characters. By default, the user must enter the same PIN code on both peripherals. Once the user has entered the PIN code, the two peripherals generate a link key. Then, this link key can be registered either in the peripherals themselves or on an external storage means. During the next exchange, the two peripherals will use the previously generated link key. This procedure is called coupling. When the link key is lost by one of the peripherals, then the coupling operation must be repeated so that a new key can be generated.

When the pieces of data that must be exchanged between two Bluetooth® terminals are sensitive data (such as bank data for example), the exchanges that follow the coupling phase are encrypted, for example by means of the E0 algorithm. E0 is the stream cipher algorithm or stream encryption algorithm used to protect the confidentiality of data in Bluetooth.

The problem however is the same as for the WEP key or the WPA key. Prior to any exchange, the user must enter a PIN code into the terminal, the length of the PIN code varying from 4 to 16 characters, given that the 16-character PIN code is preferred for the most secured applications.

Whether it is for Wi-Fi technology or for Bluetooth technology, the entry of a PIN code or of an excessively lengthy key leads to at least two types of problems, namely a major risk of error during entry (this is especially true when the entry is done in masked characters (the entered characters are not displayed but instead there is a sequence of asterisks that is displayed) and the code to be entered is lengthy); secondly, when the entry is done by hand, there is no assurance that a malicious individual will not snoop on the entry in order to appropriate the PIN code or the key for fraudulent use.

Securing solutions have been proposed, chiefly for the implementation of a Wi-Fi connection. They consist of the almost simultaneous activation of two devices to be connected together. One of these solutions is the "Wi-Fi Protection Setup (WPS)" and is a secured and simple local-area wireless network standard. This solution however does not resolve all problems since one of the variants of WPS implies the entry of a PIN code.

In the case of Bluetooth technology, which is very different from Wi-Fi (starting with the frequency bands used and with the range of the link), the solutions that have been proposed are called OOB (Out Of Band) solutions. These solutions consist of the transmission of all or part of the pairing data by means of a channel other than the Bluetooth channel and this is done so that, on either side, there is the confidential data needed to set up a secured Bluetooth channel.

Again, these approaches raise a problem, especially when the two devices are interchanged frequently as is the case for example with a smartphone type communications terminal and a payment terminal. Typically, a payment terminal and a smartphone do not have the same modes of operation and the same battery capacities. In increasing numbers of firms (among merchants), the two types of terminals are coupled, as is the case for example with the solution proposed in the patent document WO2012076573. The communications terminal and the payment terminal are assembled and communicate with each other, for example through a Bluetooth link, to exchange data on payment or on transactions. Now, very concretely, during a day of sales, salesmen frequently have to change devices, for example because of battery problems. One or other of the two terminals will have to be recharged. The discharged terminal is then replaced by a charged terminal. This requires a new pairing to be done, which can necessitate complementary handling operations such as unpairing the terminal that the user has just started charging ((i.e. cutting its the Bluetooth link) and replacing it by a replacement terminal. These complementary handlings are complicated to implement and cause users to lose time.

In other words, a simple and discreet connection solution needs to be provided, on the one hand to avoid entry error and, on the other hand, to ensure the confidentiality of the data needed for the connection or the pairing and enable terminals to be interchanged in a simple way.

3. SUMMARY

The disclosed technique has been created in keeping these prior-art drawbacks in mind. The invention relates to a method for pairing a first terminal, called an initiator terminal seeking to transmit and receive data, with a second terminal, called an acceptor terminal.

According to the invention, such a method comprises:
- a step for the placing of an external surface connector of the initiator terminal on a complementary external surface connector of the acceptor terminal delivering a piece of data to said initiator terminal about the presence of said acceptor terminal;

a step for the determining, by said initiator terminal, of a parameter of connection;

a step for the pairing of said initiator terminal with said acceptor terminal according to a mode of pairing depending on the determined parameter of connection.

Thus, it is possible to simply connect two terminals, for which it is sought to make a pairing.

According one particular characteristic, the mode of pairing belongs to the group comprising:

a mode of permanent physical connection in which the connection is exclusively provided by the external surface connector of the initiator terminal connected to the complementary external surface connector of the acceptor terminal;

a mode of temporary physical connection in which only the pairing of the initiator terminal with the acceptor terminal requires a connection between the external surface connector of the initiator terminal and the complementary external surface connector of the acceptor terminal.

Thus, in being physically connected and therefore in possessing proof of the presence of the two terminals with one another, it is possible in a secured manner to set up two modes of connection of the two terminals. Advantageously, the temporary connection mode can be a default mode in which case it can be that the permanent connection mode is not available.

According to one particular embodiment, in the temporary physical connection mode, the pairing step comprises:

a step of generation of a pairing code by the acceptor terminal;

a step of transmission of said pairing code, in the form of a first piece of data, through the connection between the surface connectors;

a step of reception of the first piece of data by said initiator terminal;

a step of finalizing of the pairing by means of the first piece of data received, through a wireless communications interface.

According to one particular embodiment, the wireless communications interface is a Bluetooth interface.

Thus, it is possible to carry out a secured Bluetooth pairing in which the presence of the two terminals is confirmed (by the fact that they are physically connected) while ensuring simple and rapid connection (with no need for a connection cable between the two terminals) and therefore easy connection for the user.

According to one particular embodiment, subsequently to the step of reception of the first piece of data by the initiator terminal, the method comprises a step of elimination of a list of acceptor terminals previously paired with said initiator terminal.

Thus, it is possible to even further secure the method of connection by modifying the list of already connected terminals (both on the initiator terminal side and on the acceptor terminal side) and therefore eliminate the former connections already established in order for example to prevent a new remote connection (which would be parasitic on the connection in progress).

According to one particular embodiment, the step for placing the external surface connector of the initiator terminal on the complementary external surface connector of the acceptor terminal creates a USB type connection between the initiator terminal and the acceptor terminal.

Thus, it is easy to have available a fast communications interface that enables an efficient exchange of data between the two terminals and to achieve this without necessitating the use of connection cables.

According to one particular embodiment, said initiator terminal is a smartphone and said acceptor terminal is a payment terminal.

The invention also relates to an initiator terminal of the type comprising a processor and a memory. According to the invention, such a terminal comprises:

an external surface connector capable of being placed on a complementary external surface connector of an acceptor terminal;

means for determining a parameter of connection to said acceptor terminal;

means of pairing with said acceptor terminal according to a mode of pairing that depends on the parameter of connection determined.

The invention also relates to an acceptor terminal of the type comprising a processor and a memory. According to the invention, such a terminal comprises:

an external surface connector capable of being placed on a complementary external surface connector of an acceptor terminal;

means of pairing with said initiator terminal according to a mode of pairing that depends on a parameter of connection determined by said initiator terminal The invention is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Besides, the information carrier can be a transmissible carrier such as an electrical or optical signal that can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented by means of software and/or hardware components. From this viewpoint, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, etc.) and could access the hardware resources of this physical entity (memories, recording carriers, communications buses, electronic input/output boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

The characteristics described here above can of courses be combined with one another without departing from the framework of the invention.

4. FIGURES

Other features and advantages of the invention shall appear more clearly from the following description of a preferred embodiment, given by way of a simple illustrative and non-exhaustive example and from the appended drawings, of which.

5. DESCRIPTION OF ONE EMBODIMENT

5.1. Reminder of the Principle

As explained here above, the invention offers a novel method for entering a pairing code (for example a PIN code) for the pairing of two devices. The invention can be applied especially to Bluetooth pairing technology, but it can also be applied to other protocols that comprise an entry, by the user, of a PIN code or a password or a pass phrase (a secret phrase used for security higher than that given by a simple password).

In one particular embodiment, which shall be described here below, the solution of the invention implements two Bluetooth terminals, one initiating the pairing process and the other accepting it, and does so simply by physically connecting these two terminals through a specific connection interface enabling direct physical connection between the two terminals, a connection without the use of cables (of the USB connection cable type). In other words, each terminal (smartphone, payment terminal) is provided with a specific physical connection interface directly accessible by contact between the two terminals. This is an external surface connection interface: the physical connection between the two terminals is made by applying the external surface connectors of two terminals to one another. It is therefore not necessary, within the framework of the present technique, to physically link the two terminals by means of a linking cable as has already been seen with other prior art connection approaches.

This connection solution is important in the context of the present technique, in order to make the operation for replacing a terminal by another totally transparent, speedy and natural for the user.

Here below, reference is made to 'initiator' and 'acceptor' to designate these terminals respectively.

Figure 1:
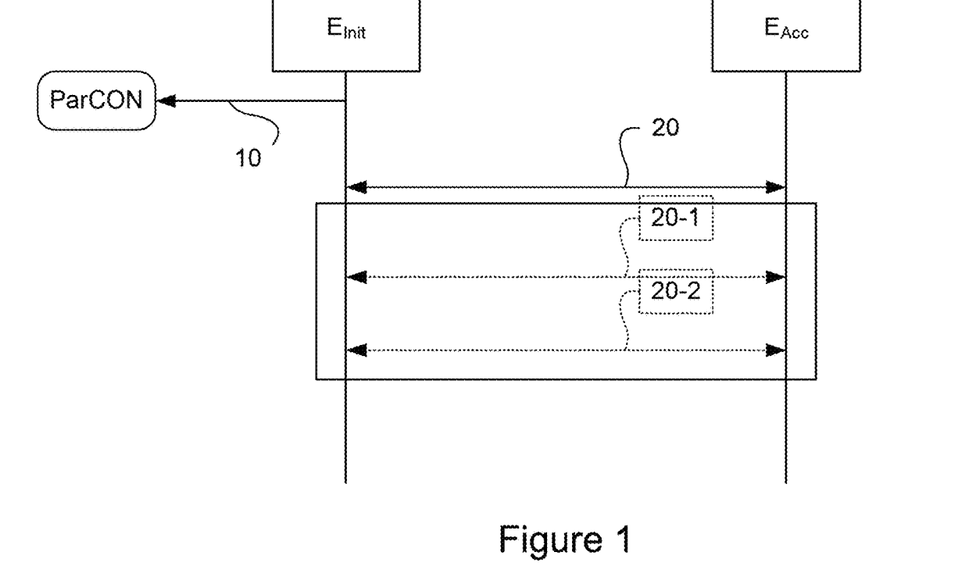
FIG. 1 describes the general principle of the pairing method.

The method of the invention is described with reference to FIG. 1. In the context of the invention, the initiator terminal $E_{init}$ (for example a communications terminal) disposes of an external surface connector (for example a male "pogo" type connector and the acceptor terminal $E_{Acc}$ (for example a payment terminal) disposes of a complementary external surface connector.

These two surface connectors enable a connection of the two terminals to each other so that a USB connection type connection is created between the two terminals by simple contact. As is explained here below, once the two terminals are physically connected, a pairing phase is implemented. As described with reference to a specific embodiment of the invention, when the communications terminal (initiator terminal) does not inherently have an external surface connector, this characteristic is provided by the use of a specific casing into which the initiator terminal is inserted.

According to the invention, the pairing process is carried out on the whole in two steps for the user, these steps being carried out after the two terminals have been connected by means of the two surface connectors:

the initiator terminal $E_{Init}$, possibly through the user, determines a parameter of connection, ParCON (the initiator terminal can also manage the commissioning of the acceptor terminal);

the acceptor terminal $E_{Acc}$ and the initiator terminal $E_{Init}$ get paired (20) according to the pairing scheme depending on the parameter of connection ParCON determined.

The pairing step (20) of the two terminals is done as follows:

when the parameter ParCON is representative of a restrictive pairing, the pairing is done (20-1) in "permanent physical connection" mode;

when the parameter ParCON represents an extended pairing, the pairing is done (20-2) in "temporary physical connection" mode The general principle of the invention is that of making good use of the wire connection to manage the automatic selection of the acceptor terminal to be paired. If necessary, the user can set parameters that do not permit automatic pairing and manage solely the reconnection with an already paired acceptor terminal (if for example the devices are not completely interchangeable among users, for example the salesmen of a sales area).

These two modes of connection are distinguished essentially by the degree of freedom permitted for the physical separation of the two terminals. In the mode of 'permanent physical connection', the two terminals can work together only if they are physically connected through their external surface connectors. If the user (or another user) separates the two terminals, it is no longer possible to make data exchanges between these two terminals. This mode of pairing ensures a certain degree of security in the interaction between the two terminals and more particularly ensures a certain degree of security in the sales area. In the "temporary physical connection", the pairing is done when the two terminals are physically connected, by means of their physical link, but the pairing is maintained when the two terminals are separate. This mode gives preference to flexibility in permitting the user to physically separate the terminals for the requirements of its function. For example, if a purchaser wishes to pay for his purchases by bank card, this second mode of pairing enables the user to separate the two terminals, in order to give the payment terminal to the purchaser during the time when this purchase is making the entries (of his bank card PIN code for example). needed for his purchase.

Figure 2:
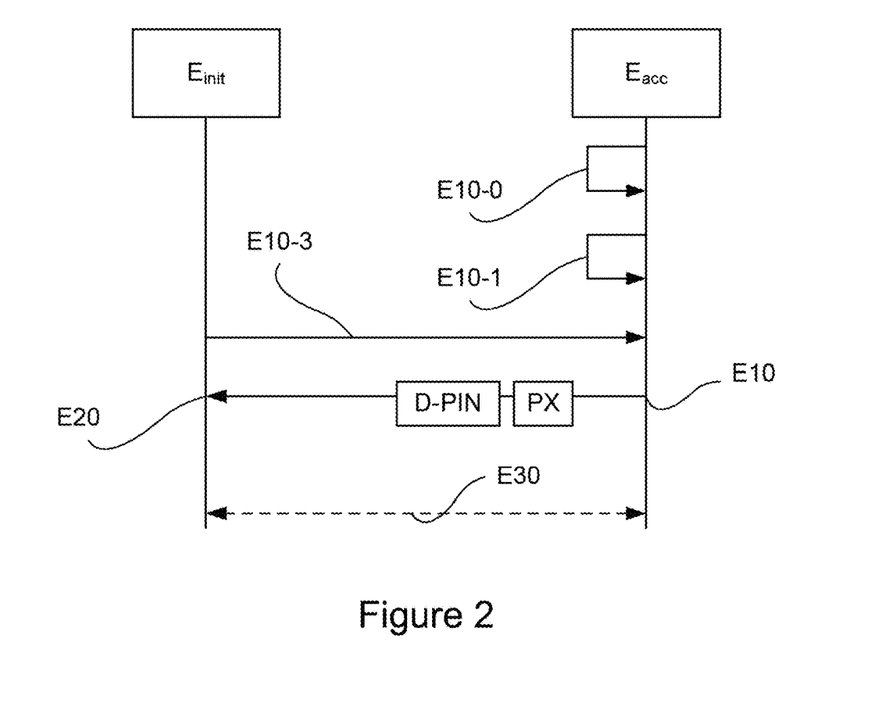
FIG. 2 describes the steps for pairing a first initiator terminal with an acceptor terminal.

The extended pairing method is thus as follows (FIG. 2):

the acceptor terminal $E_{Acc}$, transmits E10 a piece of data representing the PIN code (D-PIN) using the physical connection; as a complement, other parameters (PX)

can also be transmitted (the address of the acceptor terminal for example; this aspect is described in detail here below);

the initiator terminal $E_{Init}$ receives E20 the data representing the PIN code through of the physical connection. When other parameters are used (the address of the acceptor terminal for example) this address is also acquired;

the pairing is done by means of the wireless connection (Wi-Fi, Bluetooth): although physically connected, the two terminals use the wireless connection to finalize the pairing.

There is therefore no manual entry by the user, and this simplifies the process and averts errors.

The standard pairing mechanism with authentication is then initiated 30 and the two terminals are connected within a few seconds (depending on the radio environment).

The PIN code is generated E10-1 randomly on the acceptor terminal and is formed by the maximum number of characters possible, providing a high level of security on the link between the two terminals. In the event of an application using Bluetooth technology for example, the PIN code comprises 16 characters.

In addition, the PIN code is generated asynchronously, prior to or after the decision E10-0 for pairing the initiator terminal $E_{Init}$, with the acceptor terminal $_{Acc}$ and is therefore not stored in a non-volatile memory in the acceptor terminal $E_{Acc}$. The decision E10-0 is taken during the pairing decision for pairing the two terminals, for example at the time of the physical connection of the two terminals. The PIN code is random and volatile.

Prior to the pairing, a command for erasing the pairing list is transmitted (E10-3) by the initiator terminal to the acceptor terminal (this command can also take the form of a rotation command: i.e. a command for erasing the last result of the pairing list, namely the oldest one, and in its stead creating a new pairing with the new initiator terminal). For its part, the initiator terminal can also eliminate all or part of the entries from its own pairing list.

When two terminals are already paired, it is also possible to set up a new pairing with a new random PIN code, making it possible to modify the encryption keys periodically and therefore providing for a further increase in the security of this link. Beyond the "renewal" of the pairing between the two terminals, it is also possible to make a transfer, through the physical link, of certificates that can serve to encrypt the data (beyond the security intrinsic to the USB and/or wireless transmission). These certificates could be specific to a session, i.e. a session corresponding to a period between two pairing operations between two different terminals. In this case, the modification of the pairing list (both the list present in the acceptor terminal and the list present in the initiator terminal) can be accompanied by a modification of the corresponding list of certificates.

As explained here above, it is also possible to give the initiator terminal $E_{Init}$, in addition to the PIN code, other useful data that can be taken into account to increase the level of security of the proposed method. Depending on the embodiments, this useful data may be obligatory to enable validation of the pairing process.

This other useful data can include, for example, the address (for example the Bluetooth address) of the acceptor device $E_{Acc}$. Depending on the embodiments of the invention, the providing of this useful data can be implemented differently.

In a first embodiment, the useful data is provided separately from the PIN code. This means that subsequently to the acquisition of data representing the PIN code by the initiator terminal $E_{Init}$, a second step of reception takes place. This separation into two steps makes it possible to ensure compliance with the procedure and therefore offers additional security.

In a second embodiment, the useful data is provided jointly with the PIN code. The difference between this second embodiment and the first embodiment is situated at the instants of data acquisition (PIN data, useful data etc.).

5.2. Description of One Particular Embodiment

For this embodiment, a description is given of the implementing of the invention for the pairing of two devices by means of USB/Bluetooth technology: a smartphone is to be paired with a payment terminal. In this embodiment, the smartphone is an initiator terminal and the payment terminal is the acceptor terminal.

As compared with the difficulties and problems mentioned here above, the pairing of a payment terminal has yet other difficulties, including the obligation to ensure a level of absolute confidentiality of data transmitted to the terminal.

Figure 5A:
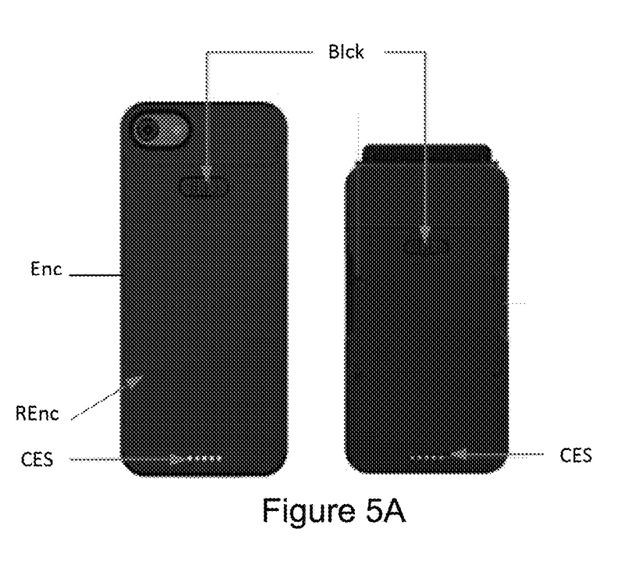
FIGS. 5A, 5B and C physically describe the pairing of a payment terminal and a communications terminal by means of two casings.
Figure 5B:
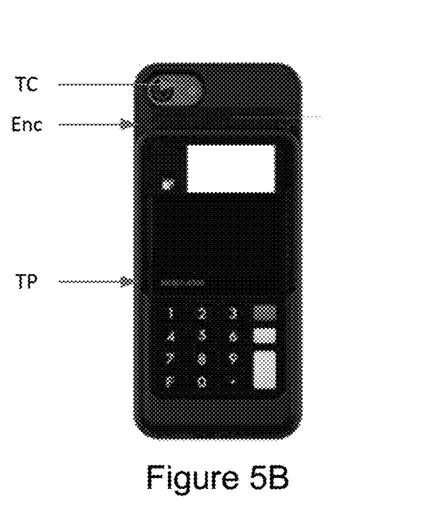
Figure 5C:
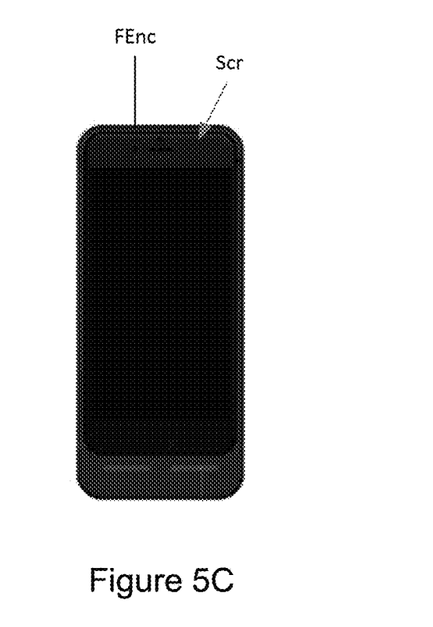

In this embodiment, presented with reference to FIGS. 5A to 5C, the initiator terminal is a classic smartphone. To enable an implementation of the method described, it is inserted into a casing (Enc, FIG. 5A, left). This casing takes the general form of a rectangular parallelepiped, with a front face provided with a large opening (FEnc, FIG. 5C) to enable the viewing of the smartphone screen (Scr) and a rear face (REnc) comprising the external surface connector (CES). This casing also has a connection device (iCoN, not shown) that is connected to the external surface connector (CES). It also comprises a blocking device (Blck) by which the terminal is held in its housing. The right-hand side of FIG. 5A presents the back of a payment terminal, which is itself inserted into a casing. It is clear that given the multiplicity of smartphones available and their formats, a casing of the present technique is more specifically intended to receive only one model of smartphone. Be that as it may, the smartphone is placed in this casing which, in its lower part, has, a connection module (iCoN) intended for connection to the USB connector of the smartphone. This connection module comprises electronic circuits and especially tracks that can generally be used to connect the USB connector with the external surface connector situated on the back of the casing (and therefore on the back of the smartphone when the smartphone is itself inserted into the casing). The casing furthermore comprises at least one surface, loosely called a 'magnetic surface': it is formed by one or more internal plates, for example metal plates or flat magnets that are molded in the casing on its back (rear face) and enable a magnetic attachment with the payment terminal (which also comprises, on its back (rear face) one or more magnetic surfaces so that the external surface connectors can be in perfect contact when the payment terminal is physically paired with the casing (and therefore with the communications terminal inserted into the casing). Ideally, to enable optimized positioning (i.e. so that the two surface connectors are accurately positioned relative to each other, it can be planned to have magnets with inverted polarities both on the casing of the communications terminal and on the payment terminal. This avoids for example the possibility that the payment terminal may be placed back to front on the casing of the communications terminal. The inverted polarities of the magnets avert these problems of positioning. FIG. 5B presents the front face (FEnc) of the communications terminal, as also the screen of the communications terminal.

The connection module (iCoN) situated in the casing has several functions. The first of them is to enable the connection of the smartphone (initiator terminal) via a USB type interface (micro USB, C type USB etc.). The second is to enable an electrical power supply of the acceptor terminal (the payment terminal for example), which is powered by drawing current from the initiator terminal (the smartphone). The third function is to power on the acceptor terminal during the connection (i.e. when the two external surface connectors are put into contact).

In one embodiment, the two external surface connectors are USB connectors: the external surface connector of the smartphone casing is moved away from the usual position of the USB connector, just like the external surface connector of the acceptor terminal. When the two connectors are assembled (attached) in placing the acceptor terminal on the casing of the initiator terminal, a USB type connection is then initiated. This USB type connection enables especially the implementing of the functions presented here above. More particularly, when the initiator terminal is inserted into the casing which comprises the connection module (iCoN) and/or when the two connectors are assembled (attached), the following method is implemented:

a pairing application (launched by the initiator terminal as a background task or a main task) detects the connection of the initiator terminal to the connection module and triggers the starting of this module;

by means of the connection module (iCoN), the acceptor terminal is detected and starts up (if it has not started up already);

a test is carried out to find out if the two terminals are already paired (or have already been paired) (a pairing done previously, during a previous implementing of the pairing method) by means of the Bluetooth protocol;

if the test is positive, the pairing is confirmed;

if the test is negative, the application of the initiator device performs a pairing according to the general method presented here above (temporary physical connection or permanent physical connection, especially comprising the modification or erasure of the pairing list and the disconnection of any connection of the payment terminal with another communications terminal—with which it has been previously coupled).

In these embodiments, the parameter of connection (permanent or temporary) can be obtained automatically or by requesting the user for a response to a pairing request. More particularly, the pairing application can ask the user if he wishes to carry out a Bluetooth pairing. If the user responds with a "yes" to this question, a pairing is made according to the procedure of FIG. 1 (Bluetooth OOB pairings via the USB connection set up by the external surface connectors). If the user responds "no" to this question, a USB type pairing is done (the pieces of data exchanged between the acceptor terminal and the initiator terminal are then exclusively exchanged by means of the connection module (iCoN) and the external surface connectors of the two terminals.

In the first example, the user can detach the initiator terminal while maintaining the Bluetooth connection between the two terminals. In the second case, in the event of disconnection between the two terminals (the two terminals are physically detached), the pairing application then displays a message of reconnection to the user.

When the connection is automatic, the pairing parameter is directly available within the communications terminal, either by means of the connection application or in a memory of the communications terminal, a memory accessible by the connection application.

Other specific features of the method can also be detailed such as for example:

the characteristic according to which the two terminals (Initiator Terminal/Acceptor Terminal are put into physical contact triggers the starting of the acceptor terminal at the initiative of the initiator terminal: the connection component (iCoN) has the capacity to transmit a wake-up message to the acceptor terminal in order to awaken it when it is for example in a stand-by or off state; this characteristic has the quality of facilitating the interaction of the acceptor terminal with an initiator terminal without any action by the user;

the characteristic according to which the initiator terminal retrieves the identifiers of the acceptor terminal, the information on connection or non-connection of the acceptor terminal via an existing connection (called xlink #1, i.e. the connection made by means of the wired surface connectors or very-short-range connectors);

and depending on a pre-existing parameter setting:

the initiator terminal transmits a request through the link #1 to stop any existing connection on a link #2 (of a same nature as the link #1) of the acceptor terminal with another initiator terminal (for reasons of security, an acceptor terminal such a payment terminal allows only one simultaneous connection);

the initiator terminal triggers a phase of (re)connection (when the pairing is already in place because it has already been done previously);

the initiator terminal transmits a request through the link #1 for the erasure of the pairing list of the initiator terminal (to enforce a singleness of pairing and prevent a stolen (already paired) acceptor terminal from getting connected.

the characteristic according to which an automatic transmission is made from one mode of operation to another: the method procures simultaneous (or non-simultaneous) management of the wired or non-wired (Bluetooth) connection, automatic switching from one to the other according to parametrizable switching criteria; this way of managing the connection and the operation of the two terminals relative to each other brings flexibility of use for the daily implementing of the pairing; besides, through the technique of the invention, it is possible to maintain (or not maintain) the second connection when the first one is active;

the characteristic according to which a security management is carried out: the method comprises a management of a timeout to enforce a physical connection (link #1): for example a timeout every five minutes to maintain a connection/or even a pairing (the pairing list is automatically erased if there is a physical disconnection for a period of time exceeding the pre-determined time) on the wireless connection (for example Bluetooth); as a complement in the event of prolonged disconnection (for a period of time defined in a second parameter), an automatic blocking mechanism can be implemented (complete blocking of the acceptor terminal);

the characteristic according to which the pairing is done automatically and according to which a switching is done automatically from a wired connection to a wireless connection (Bluetooth) dynamically without action by the user.

5.3. Other Feathers and Advantages

The invention has been described in a particular embodiment. It is clearly understood that the invention is in no way limited to this embodiment. The invention also relates to terminals that are used to enable the pairing as described here above. More particularly, the invention relates to an acceptor terminal. The acceptor terminal comprises, according to the invention, means for generating a pairing code in response to this pairing decision, transmission means in the form of a piece of data of the pairing code. These means of transmission can, as indicated, consist of a printer, a screen or a means of sound transmission.

All these means are driven by a computer program specifically adapted, as a function of an initial pairing protocol, to generating a pairing code, converting it into a piece of data and rendering this piece of data. The computer program furthermore comprises a phase for suspending the pairing so long as the pairing procedure has not been completed in the initiator terminal.

The invention also relates to an initiator terminal. The initiator terminal comprises, according to the invention, means for obtaining a piece of data of a pairing code in response to this paring decision, means for pairing the piece of acquired data delivering a pairing code or other useful data as a function of the data and its type. These means for obtaining can, as already indicated, consist of an optical sensor, a camera, a microphone.

All these means are driven by a computer program specifically adapted, as a function of an initial pairing protocol, to obtaining one or more pieces of data, decoding them into a pairing code and implementing the subsequent pairing. The computer program furthermore comprises a phase of suspension of the pairing so long as a pairing procedure has not been completed in the acceptor terminal.

Figure 3:
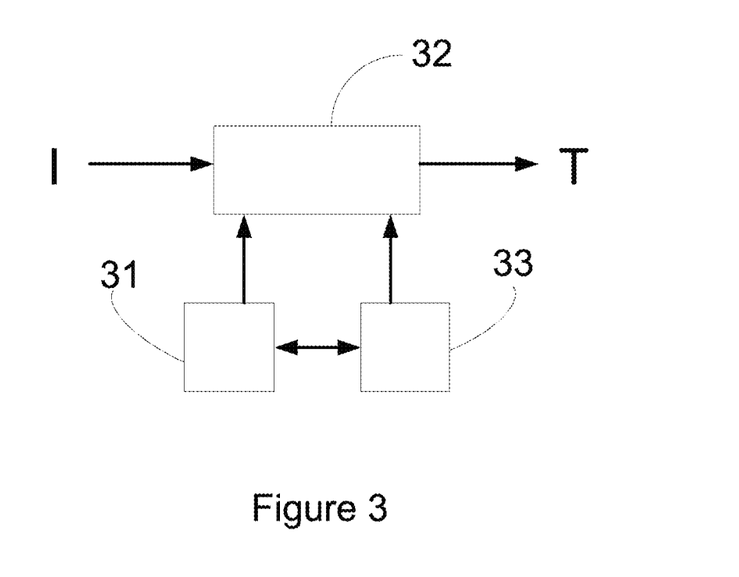
FIG. 3 symbolizes an acceptor terminal according to the invention.

Referring to FIG. 3, we present one embodiment of the terminal according to the invention.

Such an acceptor terminal comprises a memory 31 consisting of a buffer memory, a processing unit 32, equipped for example with a microprocessor P and driven by a computer program 33 implementing the method of modification according to the invention At initialization, the code instructions of the computer program 33 are for example loaded into a RAM and then executed by the processor of the processing unit 32. The processing unit 32 inputs at least one piece of information I, such as a pairing decision. The microprocessor of the processing unit 32 implements the steps of the pairing method described here above, according to the instructions of the computer program 33 to deliver a piece of processed information T such as the piece of data or pieces of data needed for the pairing of the terminal. To this end the terminal comprises, in addition to the buffer memory 31, the means described here above and especially an external surface connector capable of being placed on a complementary external surface connector of an acceptor terminal, means for determining a parameter of connection to said acceptor terminal and means of pairing with said acceptor terminal according to a mode of pairing depending on the determined parameter of connection. These means can be directly integrated into the initiator terminal or adjoined to it, for example by means of a connection packet comprising for example a connection module. These means are driven by the microprocessor of the processing unit 32. The components and means described can be secured components, trusted components or components combining the secured structures and the non-secured structures.

Figure 4:
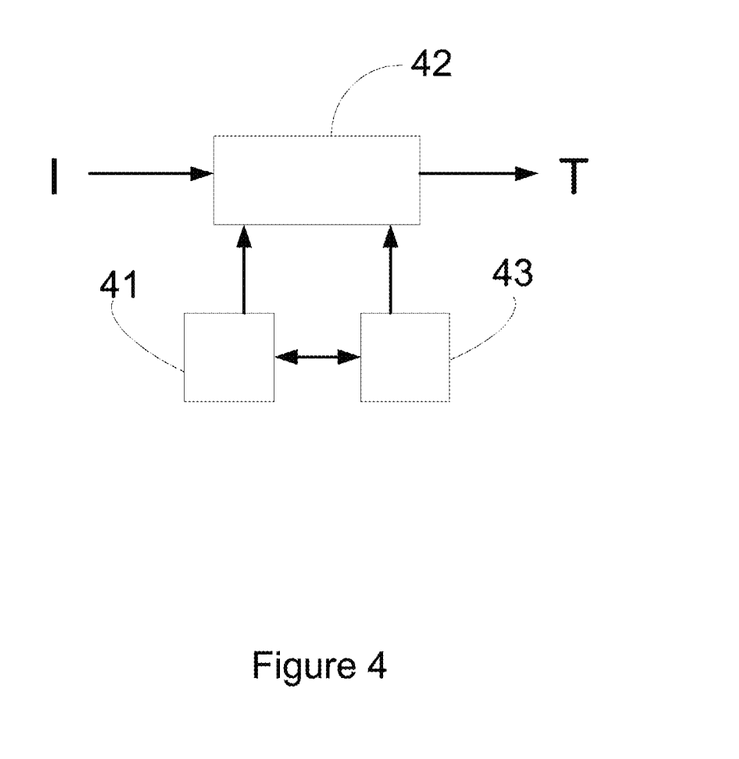
FIG. 4 symbolizes an initiator terminal according to the invention.

Referring now to FIG. 4, we present an embodiment of an initiator terminal according to the invention.

Such a device comprises a memory 41 constituted by a buffer memory, a processing unit 42 equipped for example with a microprocessor P and driven by the computer program 43, implementing the method of pairing according to the invention.

At initialization, the code instructions of the computer program 43 are for example loaded into a RAM and then executed by the processor of the processing unit 42. The processing unit 42 inputs at least one piece of information I, such as a piece of data coming from the acceptor terminal. The microprocessor of the processing unit 42 implements the steps of the method of modification described here above, according to the instructions of the computer program 43, to deliver a piece of processed information T, such as the pairing program. To this end, the device comprises, in addition to the buffer memory 41, the means described here above and especially an external surface connector capable of being placed on a complementary external surface connector of an initiator terminal and means of pairing with said initiator terminal according to a mode of pairing that depends on a parameter of connection determined by said initiator terminal. These means can be directly integrated into the initiator terminal or adjoined to it for example by means of a connection casing comprising for example a connection module. These means are driven by the microprocessor of the processing unit 42. The components and means described can be secured components, trusted components or components combining the secured structures and non-secured structures.

As will have been perfectly understood, the method of pairing as described here above comprises in fact a first sub-method of pairing that is implemented on the initiator terminal and a second sub-method of pairing that is implemented on the acceptor terminal, these two methods being possibly implemented independently of each other.

The invention claimed is:

1. A method for pairing a first terminal, called an initiator terminal seeking to transmit and receive data, with a second terminal, called an acceptor terminal, wherein said method comprises:
    placing an external surface connector of the initiator terminal on a complementary external surface connector of the acceptor terminal, said initiator terminal receiving a piece of data about a presence of said acceptor terminal;
    determining, by said initiator terminal, a parameter of connection; and
    pairing said initiator terminal with said acceptor terminal according to a mode of pairing depending on the determined parameter of connection,
    wherein said mode of pairing belongs to the group consisting of:
        a mode of permanent physical connection in which the connection is exclusively provided by the external surface connector of the initiator terminal connected to the complementary external surface connector of the acceptor terminal;
        a mode of temporary physical connection in which only the pairing of the initiator terminal with the acceptor terminal requires a connection between the external surface connector of the initiator terminal and the complementary external surface connector of the acceptor terminal.

2. The method of pairing according to claim 1, wherein, in the temporary physical connection mode, the pairing comprises:
generating a pairing code by the acceptor terminal;
transmitting said pairing code, in the form of a first piece of data, through the connection between the surface connectors;
receiving the first piece of data by said initiator terminal;
finalizing the pairing by using the first piece of data received, through a wireless communications interface.

3. The method of pairing according to claim 2, wherein the wireless communications interface is a Bluetooth interface.

4. The method of pairing according to claim 2, wherein, subsequently to the reception of the first piece of data by the initiator terminal, the method comprises elimination of a list of acceptor terminals previously paired with said initiator terminal.

5. The method according to claim 1, wherein placing the external surface connector of the initiator terminal on the complementary external surface connector of the acceptor terminal creates a USB type connection between the initiator terminal and the acceptor terminal.

6. The method of pairing according to claim 1, wherein said initiator terminal is a smartphone and said acceptor terminal is a payment terminal.

7. An initiator terminal comprising:
an external surface connector capable of being placed on a complementary external surface connector of an acceptor terminal; and
a processor and a non-transitory computer-readable medium comprising instructions stored thereon which when executed by the processor configure the initiator terminal to perform acts comprising:
determining a parameter of connection to said acceptor terminal; and
pairing with said acceptor terminal according to a mode of pairing that depends on the parameter of connection determined,
wherein said mode of pairing belongs to the group consisting of:
a mode of permanent physical connection in which the connection is exclusively provided by the external surface connector of the initiator terminal connected to the complementary external surface connector of the acceptor terminal;
a mode of temporary physical connection in which only the pairing of the initiator terminal with the acceptor terminal requires a connection between the external surface connector of the initiator terminal and the complementary external surface connector of the acceptor terminal.

8. An acceptor terminal comprising:
an external surface connector capable of being placed on a complementary external surface connector of an initiator terminal; and
a processor and a non-transitory computer-readable medium comprising instructions stored thereon which when executed by the processor configure the acceptor terminal to perform acts comprising:
pairing with said initiator terminal according to a mode of pairing that depends on a parameter of connection determined by said initiator terminal,
wherein said mode of pairing belongs to the group consisting of:
a mode of permanent physical connection in which the connection is exclusively provided by the complementary external surface connector of the initiator terminal connected to the external surface connector of the acceptor terminal;
a mode of temporary physical connection in which only the pairing of the initiator terminal with the acceptor terminal requires a connection between the complementary external surface connector of the initiator terminal and the external surface connector of the acceptor terminal.

9. A non-transitory computer-readable medium comprising program code instructions stored thereon for executing a method of pairing a first terminal, called an initiator terminal seeking to transmit and receive data, with a second terminal, called an acceptor terminal, when the instructions are executed by a computer, wherein the method comprises:
placing an external surface connector of the initiator terminal on a complementary external surface connector of the acceptor terminal, said initiator terminal receiving a piece of data about a presence of said acceptor terminal;
determining, by said initiator terminal, a parameter of connection; and
pairing said initiator terminal with said acceptor terminal according to a mode of pairing depending on the determined parameter of connection,
wherein said mode of pairing belongs to the group consisting of:
a mode of permanent physical connection in which the connection is exclusively provided by the external surface connector of the initiator terminal connected to the complementary external surface connector of the acceptor terminal;
a mode of temporary physical connection in which only the pairing of the initiator terminal with the acceptor terminal requires a connection between the external surface connector of the initiator terminal and the complementary external surface connector of the acceptor terminal.

* * * * *